UNITED STATES PATENT OFFICE.

PAUL ALPHONSE HUBERT MOSSAY, OF LONDON, ENGLAND.

DYNAMO-ELECTRIC MACHINE.

1,405,616.  Specification of Letters Patent.  Patented Feb. 7, 1922.

Application filed September 12, 1919. Serial No. 323,325.

*To all whom it may concern:*

Be it known that I, PAUL ALPHONSE HUBERT MOSSAY, a subject of the King of the Belgians, residing at London, England, have invented certain new and useful Improvements in Dynamo-Electric Machines, of which the following is a specification.

The invention relates to improvements in the cooling of dynamo electric machines, for example motors of the totally enclosed type.

In specification to Patent No. 1,320,781, Nov 4, 1919, is is proposed to circulate the hot internal air of the machine through channels beyond the field periphery in contact with the metallic walls or other channels through which cold fluid, for instance air, is passed for the purpose of obtaining an increased cooling surface without unduly increasing the dimensions of the machine so that the output is increased per unit of area and a saving is effected in material and labour in the manufacture of the machine. In one particular example the channels for the hot air are therein described as formed by sheet metal tubes.

In specification to application Serial No. 229489, filed April 19, 1918, patented June 1, 1920, No. 1,342,179, the channels for the hot and cold air are described as formed directly in the machine casing.

In these prior instances referred to end shields having flutings and openings are described to guide the hot and cold air alternately into the respective channels. Moreover the design for the casing, in some instances, is complex.

The object of the present invention is to avoid the above difficulties and to obtain high cooling efficiency by means of a construction of casing which is simple, and in some cases may be used if desired as a standard design for either enclosed or open frame machines, the construction in the case of enclosed machines permitting of the application of cooling tubes in a simple and economical manner, whereby a large cooling surface may be obtained.

According to the invention the casing of the machine whether for direct or alternating current, is formed with large circumferential longitudinal channels, terminated by flanges or tube-plates for supporting the ends of numerous tubes, set in the large channels and forming the ducts or channels for the hot internal air of the machine, which is conducted to them by imperforate end shields of simple design abutting against the flanges, the cooling fluid, for instance air, from the atmosphere, being forced into the large channels by plain outer covers, fitted to the periphery of the casing so as to enclose openings therein leading to the large channels.

The invention includes the converse arrangement wherein the end shields conduct the hot internal air to the large channels and the outer covers conduct the cold air or other cooling fluid to the tubes, but in either case the end shields need only be plain circular covers requiring machining merely at the rims where they fit against the end flanges of the casing.

In the accompanying drawings:—

Figure 1:
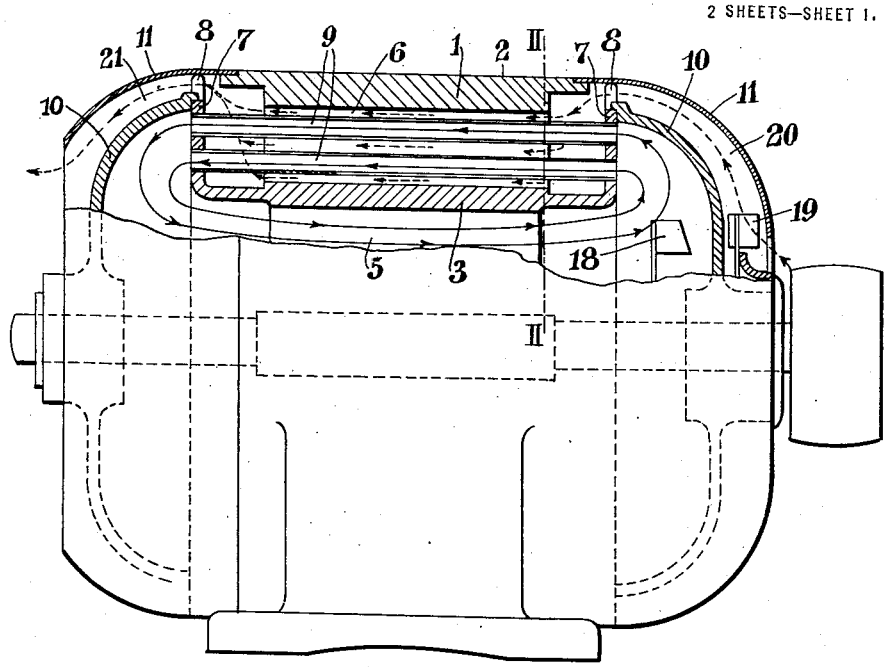
Figure 1 is a side elevation, partly in section, of one form of direct current motor according to the invention, Figure 2 being a transverse section on II—II Fig. 1 of part of the casing.
Figure 2:
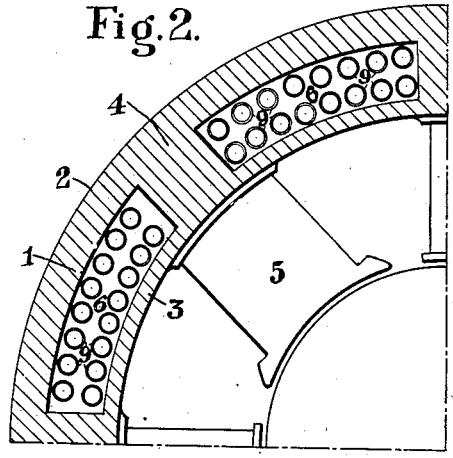

In one form of the invention, for instance in the application to a direct current electric motor as shown in Figures 1 and 2, the casing or magnet ring 1, is made in substantially cylindrical form, as a hollow annulus, so that is there are two shells 2, 3, connected by cross webs 4 which are formed together with or support the pole pieces 5. The annulus is thus divided into as many channels 6 as there are pole-pieces.

The casing 1 is provided at each end with a flange 7 which, except for openings 8 adjacent to the periphery, closes off the channels 6.

Each flange 7 is drilled with numerous holes opposite to each large channel 6 and thin metal tubes 9 are threaded through the two end flanges 7 which thereby act as tube-plates. The tubes 9 may be expanded, screwed, brazed or otherwise suitably secured in position in an airtight manner. The tubes 9 may be set into the mould in which the casing is cast or they may be set in position in large holes in the flanges and metal may be run or cast around their ends. They may be secured to sheet metal rings or tube-plates.

A plain imperforated dished end shield or cover 10 is turned on its rim to fit each end flange 7 on a narrow circumferential strip or face thereon. The hot internal air of the machine, circulated by a fan 18 or by the armature of the machine, is conducted by one end shield 10 into the tubes 9 as indicated by the arrows in full lines, and from the opposite ends of the tubes is led back by the opposite end shield into the interior of the machine.

Outer thin metal covers 11 are fitted to the ends of the casing, so as to form with the end shields 10 conduits 20, 21, to and from the openings 8 respectively into and out of the large channels 6 of the casing. Cooling fluid, for example cold air, is impelled by suitable means for instance a fan 19 through one conduit 20 into the channels 6 and out through the conduit 21 at the other end.

The openings 8 in the ends of the casing leading to the channels 6 are suitably shaped to cause the cold air to take a more or less sinuous path across and among the tubes 9 as indicated by the dotted arrows in Figure 1.

In an arrangement as above described not only is a very large cooling surface obtained by the aggregate area of the large number of tubes, but the internal surface of the hollow casing or magnet ring is available for cooling purposes. The end shields 10 may have radial fins or webs 12 to offer increased cooling surface, but otherwise, except for the central shaft opening, the shields need only be plain imperforate dished castings. The fans for the hot and cold air may be arranged at the same opposite ends of the armature shaft and they may be arranged to circulate the air in the same or opposite directions.

Figure 4:
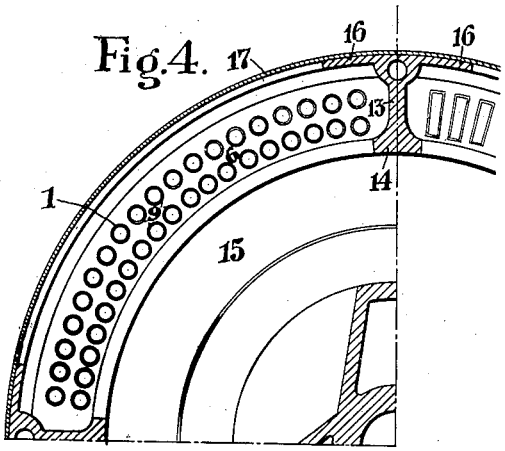
Figures 3 and 4 are longitudinal and transverse sectional views of part of an alternating current motor with the invention applied.
Figure 3:
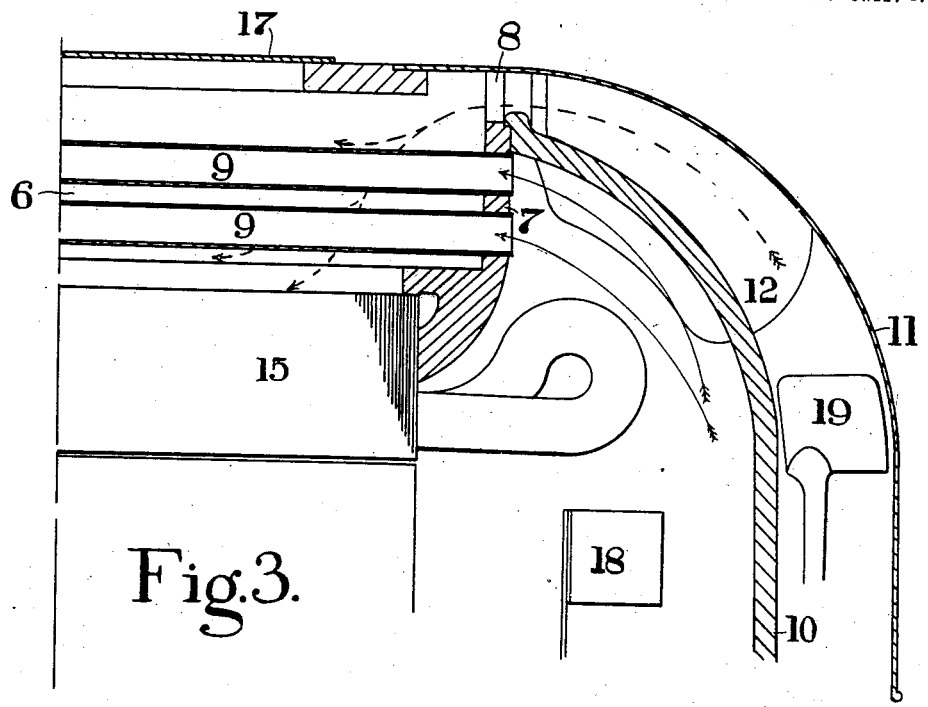
Figure 5:
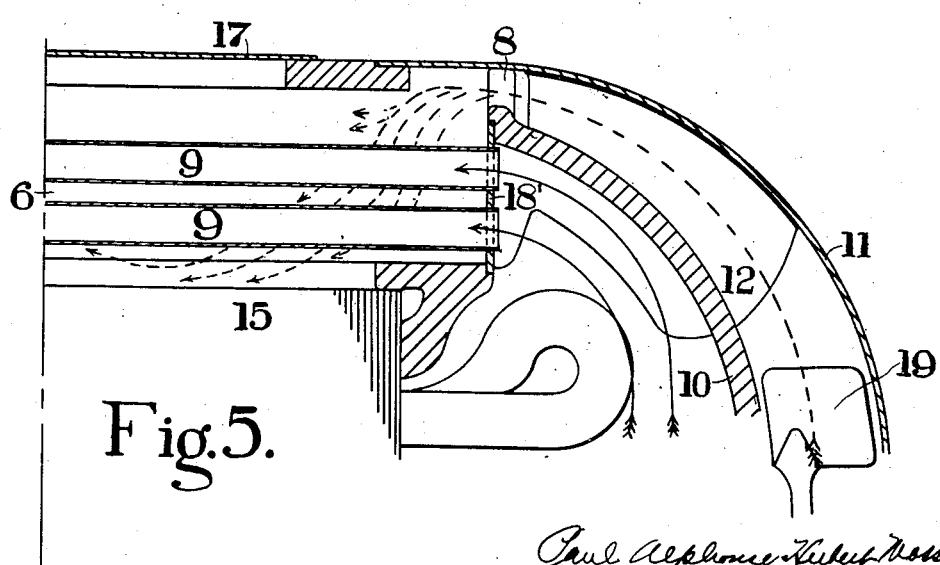
Figure 5 is a longitudinal section of part of an alternating motor illustrating an alternative mode of securing the tubes.

The outer shell may be made of sheet metal as indicated at 17 in Figure 3, the shell 3 being made of sufficient thickness to provide the required area for the magnetic flux in the case of a direct current motor, or in the application to an alternating current machine as indicated in Figures 3 and 4, the casing 1 is cast in the form of an open cage comprising two end flanges 7 connected by several longitudinal pairs of spaced bars or ribs 13. The inner webs 14 of the ribs 13 support the laminæ or magnet ring 15 while the outer webs 16 of the ribs, in the case of an enclosed machine, support light sheet metal covering 17. Numerous thin metal tubes 9 are supported in the annular space between the laminæ 15 and the thin sheet metal covering 17. These tubes 9 are supported by the end flanges 7 either directly, or by thin metal tube plates 18', Figure 5. The tubes may be secured in any suitable manner as hereinbefore described.

Openings 8 at or near the periphery of each end of the casing, are provided for the cooling fluid for instance cold air, the end shields 10 and outer end covers 11 are fitted as above described.

The cage form of casing just described may form a standard casing which is available not only for an enclosed machine but for an open type machine.

The tubes 9 may be of circular cross section, as in the left hand side of Figure 4, or of angular cross section as in the right hand side of Figure 4. They may be plain, corrugated, fluted or sinuous.

Baffles may be fitted in suitable positions to cause the cooling fluid to take a sinuous or helical path if desired.

I claim:—

1. An enclosed dynamo electric machine having a magnet ring hollow in its interior to form air channels, a series of tubes extending longitudinally within said channels and spaced apart from one another and from the interior walls of the magnet ring, said channels being in communication with the atmosphere and said tubes being in communication with the enclosed interior of the machine, whereby the hot internal air of the machine will be adapted to pass through said tubes and the cold air from the exterior of the machine will be adapted to pass through said channels and to come into direct contact with the interior walls of the magnet ring and the exterior walls of the tubes to cool the magnet ring and the hot internal air.

2. An enclosed dynamo electric machine having a magnet ring hollow in its interior to form air channels, a series of tubes extending longitudinally within said channels and spaced apart from one another and from the interior walls of the magnet ring, imperforate covers on each end of the machine spaced apart to form conduits connecting at one end with the outside air and at the other end with the interior channels of the magnet ring, the interior imperforate covers permitting communication between the tubes and the interior of the machine, means for circulating the hot internal air of the machine through said tubes, and means for circulating cold air through the conduits to the air channels, whereby cold air will be brought directly into contact with the internal walls of the magnet ring and with the exterior walls of the tubes to cool both the magnet ring and the hot internal air.

In testimony whereof I have signed my name to this specification in the presence of two subscribing witnesses.

PAUL ALPHONSE HUBERT MOSSAY.

Witnesses:
JAS. HAYWARD,
STANLEY SMITH.